US009649567B2

(12) United States Patent
Hawver et al.

(10) Patent No.: US 9,649,567 B2
(45) Date of Patent: *May 16, 2017

(54) METHOD AND APPARATUS FOR CONFIGURING A COMPUTING ENVIRONMENT

(71) Applicant: STEELSERIES APS, Valby (DK)

(72) Inventors: Bruce Hawver, Hawthorn Woods, IL (US); Kim Rom, San Francisco, CA (US); Jeffrey Nicholas Mahlmeister, Chicago, IL (US); Jacob Wolff-Petersen, Richmond (GB); Francis Arnold Grever, Palatine, IL (US); Tino Soelberg, Valby (DK); Christopher John Nicolella, Elk Grove Village, IL (US)

(73) Assignee: STEELSERIES ApS, Frederiksberg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,047

(22) Filed: Sep. 14, 2015

(65) Prior Publication Data

US 2016/0001179 A1    Jan. 7, 2016

Related U.S. Application Data

(63) Continuation of application No. 13/858,675, filed on Apr. 8, 2013, now Pat. No. 9,165,425.

(51) Int. Cl.
*A63F 13/69* (2014.01)
*G06F 9/44* (2006.01)
*G07F 17/32* (2006.01)
*G06F 9/445* (2006.01)

(52) U.S. Cl.
CPC .......... *A63F 13/69* (2014.09); *G06F 9/44505* (2013.01); *G07F 17/3227* (2013.01)

(58) Field of Classification Search
CPC ... A63F 13/69; G06F 9/44505; C07F 17/3227
See application file for complete search history.

(56) References Cited

U.S. PATENT DOCUMENTS

| | | |
|---|---|---|
| 2003/0105863 A1 | 6/2003 | Hegli et al. |
| 2005/0155033 A1 | 7/2005 | Luoffo et al. |
| 2005/0160428 A1 | 7/2005 | Ayachitula et al. |
| 2006/0090162 A1 | 4/2006 | Flores et al. |

(Continued)

*Primary Examiner* — Stefan Stoynov
(74) *Attorney, Agent, or Firm* — Guntin & Gust, PLC; Atanu Das

(57) ABSTRACT

A method that incorporates teachings of the present disclosure may include receiving, by a system comprising a processor, a request from a mobile communication device to configure a computing environment for executing a software application, identifying a deficiency in an availability of a resource of the computing environment responsive to receiving the request, adjusting an operation of the computing environment to change the availability of the resource responsive to identifying the resource deficiency, and providing an action of a plurality of associable actions to the computer environment for use in the software application, where the action replaces a received stimulation of a user input that is associated with the executing of the software application. Other embodiments are disclosed.

18 Claims, 13 Drawing Sheets

(56) References Cited

U.S. PATENT DOCUMENTS

2007/0234365 A1  10/2007  Savit
2011/0289506 A1  11/2011  Trivi et al.
2012/0023503 A1   1/2012  Trivi et al.
2012/0201255 A1*  8/2012  Manor ............... H04N 21/2385
                                                      370/468

* cited by examiner

COMPUTING ENVIRONMENT

INITIAL RESOURCE AVAILABILITY

| | |
|---|---|
| Processing Available Capacity | 20% |
| Memory Available Capacity | 30% |
| Anti-Virus Scanning | ON |
| Internet Available Bandwidth | 25% |

INITIAL PROCESSES

| | |
|---|---|
| Application | A |
| Application | B |
| Application | C |
| Application | D |

ADJUSTED RESOURCE AVAILABILITY

| | |
|---|---|
| Processing Available Capacity | 40% |
| Memory Available Capacity | 65% |
| Anti-Virus Scanning | OFF |
| Internet Available Bandwidth | 45% |

ADJUSTED PROCESSES

| | |
|---|---|
| Application | A |
| Application | D |

REQUIRED RESOURCE AVAILABILITY

| | |
|---|---|
| Processing Available Capacity | 35% |
| Memory Available Capacity | 50% |
| Anti-Virus Scanning | OFF |
| Internet Available Bandwidth | 40% |

Gamer Hardware Statistics

| | Gamer | | | | | |
|---|---|---|---|---|---|---|
| Weapon Type | Subs Invoked | Macros Invoked | Shots | Rapid Shots | Single Shots | |
| Sniper rifle | Up/Dwn | Team chat | 14 | 4 | 10 | |
| Machine gun | Left 1 button | Toggle B/w Machine Gun Sniper Rifle | 66 | 60 | 6 | |
| Hand gun | Right 1 button | Call for air support | 10 | 6 | 4 | |

FIG. 13

Gamer Performance Factors

| | Gamer | | | | | |
|---|---|---|---|---|---|---|
| Weapon Type | Misses | Non-kill hits | Kill hits | Avg hit rate | Loss of life rate | Comp Rating |
| Sniper rifle | 3 | 7 | 4 | 29% | 5% | Trailing |
| Machine gun | 36 | 12 | 18 | 33% | 27% | Leading |
| Hand gun | 5 | 2 | 3 | 30% | 80% | Near even |

FIG. 14

METHOD AND APPARATUS FOR CONFIGURING A COMPUTING ENVIRONMENT

CROSS-REFERENCE TO RELATED APPLICATIONS

This application is a Continuation of and claims priority to U.S. patent application Ser. No. 13/858,675, filed Apr. 8, 2013. The contents of the foregoing are hereby incorporated by reference into this application as if set forth herein in full.

FIELD OF THE DISCLOSURE

The present disclosure relates generally to a method and apparatus for configuring a computing environment.

BACKGROUND

It is common today for gamers to utilize expect exceptional performance from video gaming systems. Computing environments can have a large impact on the execution and user acceptance of video gaming applications. While computing environments are generally evolving to provide better operating characteristics, it is often desirable to configure computing environments in ways that improve performance and acceptance.

BRIEF DESCRIPTION OF THE DRAWINGS

Reference will now be made to the accompanying drawings, which are not necessarily drawn to scale, and wherein:

FIG. 7 depicts illustrative embodiments of configuring a computer environment to provide resources for executing a software application;

FIGS. 13-14 depict illustrative embodiments for gamer hardware statistics and gamer performances.

DETAILED DESCRIPTION

Figure 1:
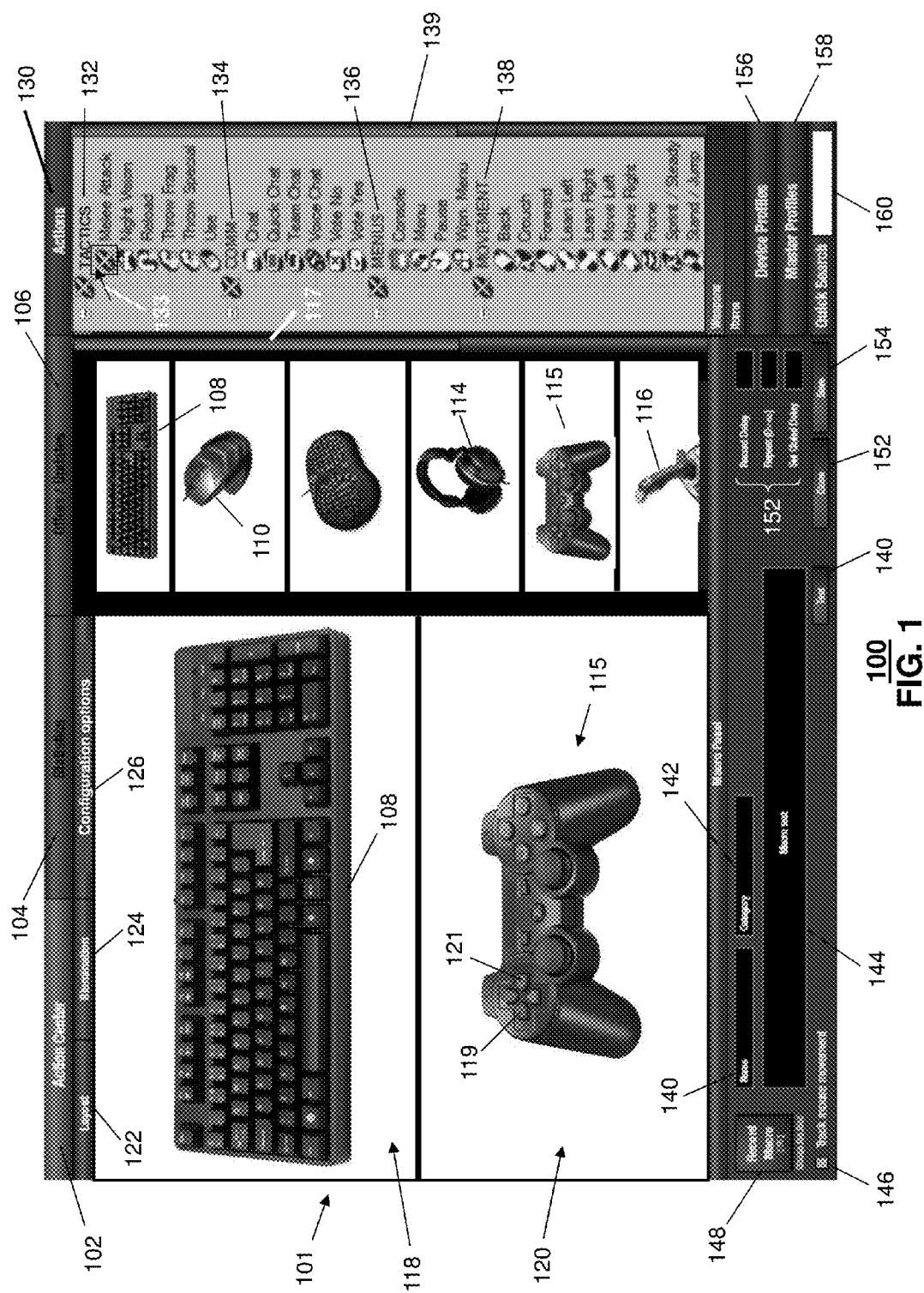
FIG. 1 depicts an illustrative embodiment of a Graphical User Interface (GUI) generated by an Accessory Management Software (AMS) application according to the present disclosure.

The subject disclosure describes, among other things, illustrative embodiments for improving performances a game executing on a computer device. Other embodiments are contemplated by the subject disclosure.

One embodiment of the present disclosure can entail a computer-readable storage medium having computer instructions, which when executed by a processor, cause the processor to perform operations including receiving a request to configure a computing environment for executing a software application. The processor can also perform operations for determining an availability of a resource of the computing environment, responsive to receiving the request, and comparing the availability of the resource to a preferred availability from configuration information to identify a resource deficiency. The processor can further perform operations for adjusting an operation of the computing environment to change the availability of the resource responsive to identifying the resource deficiency. The processor can perform operations for detecting a stimulation of a user input associated with the executing of the software application, retrieving an action of a plurality of associable actions based on the stimulation that is detected, and, in turn, providing the action to the computing environment for use in the software application.

One embodiment of the present disclosure can entail a device having a memory to store computer instructions, and a processor coupled to the memory. When executing the computer instructions, the processor can perform operations including receiving a request to configure a computing environment for executing a software application and determining an availability of a resource of the computing environment responsive to receiving the request. The processor can further perform operations for comparing the availability of the resource to a preferred level from configuration information to identify a resource deficiency. The processor can also perform operations for adjusting an operation of the computing environment to change the availability of the resource responsive to identifying the resource deficiency.

One embodiment of the present disclosure can entail a method for receiving, by a system comprising a processor, a request from a mobile communication device to configure a computing environment for executing a software application. The method further includes identifying, by the system, a deficiency in an availability of a resource of the computing environment responsive to receiving the request. The method also includes adjusting, by the system, an operation of the computing environment to change the availability of the resource responsive to identifying the deficiency. The method includes, in turn, providing an action of a plurality of associable actions to the computer environment for use in the software application, wherein the action replaces a received stimulation of a user input that is associated with the executing of the software application.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a server, a mainframe computer, a gaming console, a gaming accessory, or combinations or portions thereof. The AMS application can also be executed by portable computing devices (with computing resources) such as a cellular phone, a personal digital assistant, or a media player (such as an iPOD™). It is contemplated that the AMS application can be executed by any device with suitable computing resources.

Figure 2:
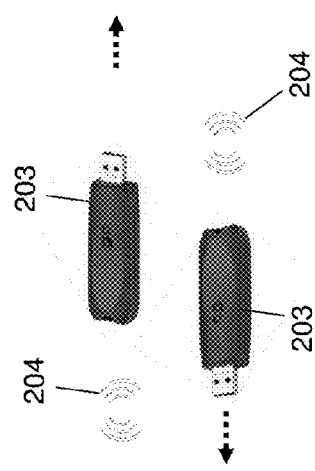
FIGS. 2-3 depict illustrative embodiments for communicatively coupling a gaming controller to a computing device.

FIG. 2 illustrates a number of embodiments for utilizing a wireless dongle 203 with gaming controller 115 or a gaming console (herein referred to as gaming console 206). In the illustration of FIG. 2, the USB portion of the dongle 203 can be physically engaged with the gaming controller 115 or the gaming console 206. The dongle 203 in either of these configurations can facilitate wireless communications 204 between the gaming controller 115 and the gaming console 206 (e.g., WiFi, Bluetooth, ZigBee, or proprietary protocol). It is contemplated that functions of the dongle 203 can in whole or in part be an integral part of the gaming controller 115 or the gaming console 206. It is also contemplated that the AMS application can in whole or in part be executed by computing resources of the dongle 203.

Figure 3:
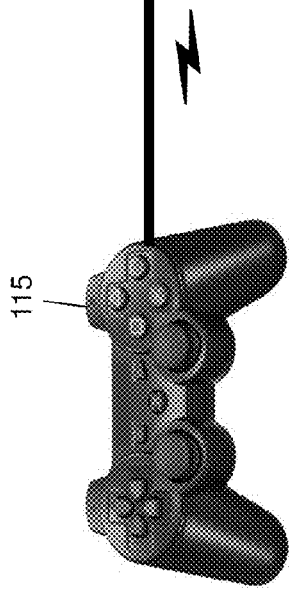

In one embodiment, the gaming controller 115 can be tethered to a computer computing device such as the gaming console 206 by a cable (e.g., USB cable) as shown in FIG. 3 to provide a means of communication less susceptible to electromagnetic interference or other sources of wireless interference. In one embodiment, the gaming controller 115 and the gaming console 206 can have an integrated wireless interface for wireless communications. It is contemplated that the AMS application can in whole or in part be executed by computing resources of the gaming controller 115, the gaming console 206, or combinations thereof.

Figure 4:
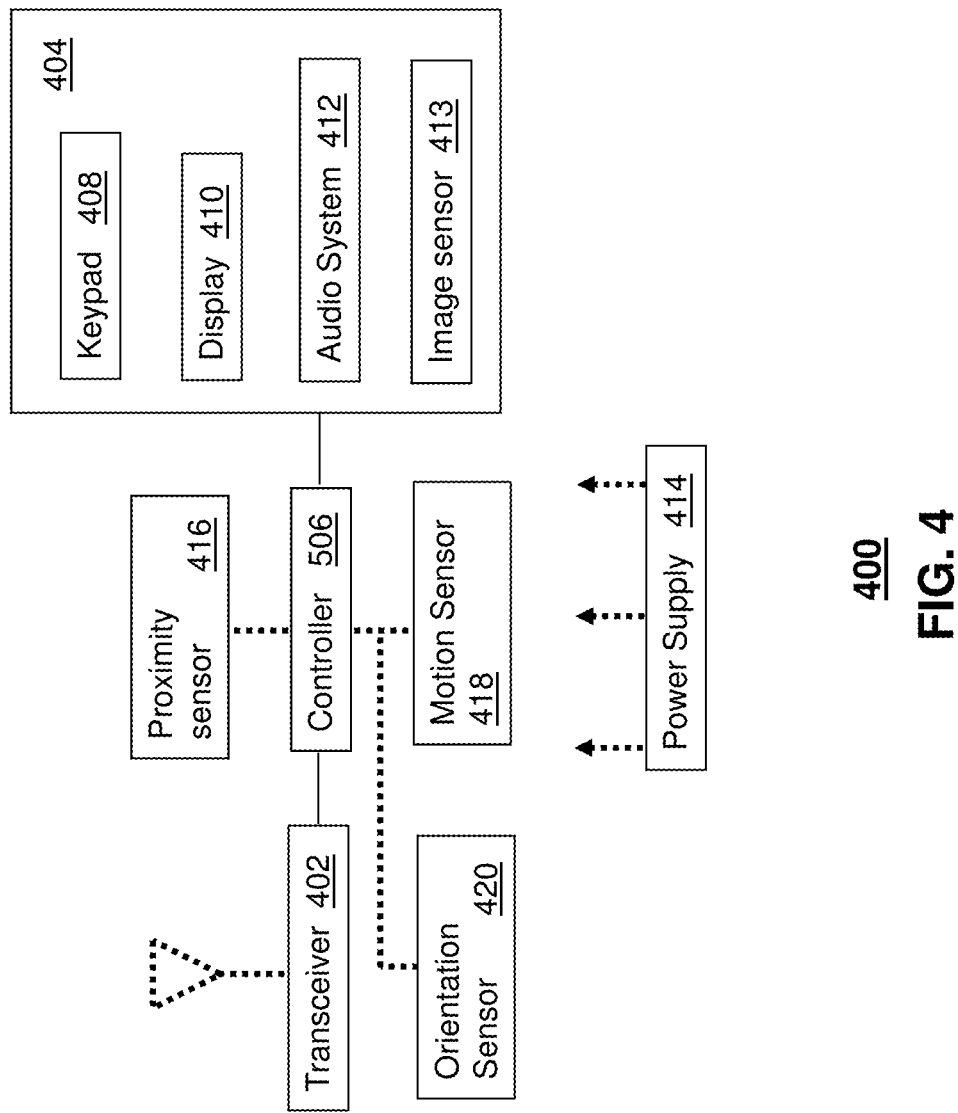
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 1-3. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the present disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4 to accommodate the implementation of the devices described by the present disclosure. These variant embodiments are contemplated by the present disclosure.

Figure 5:
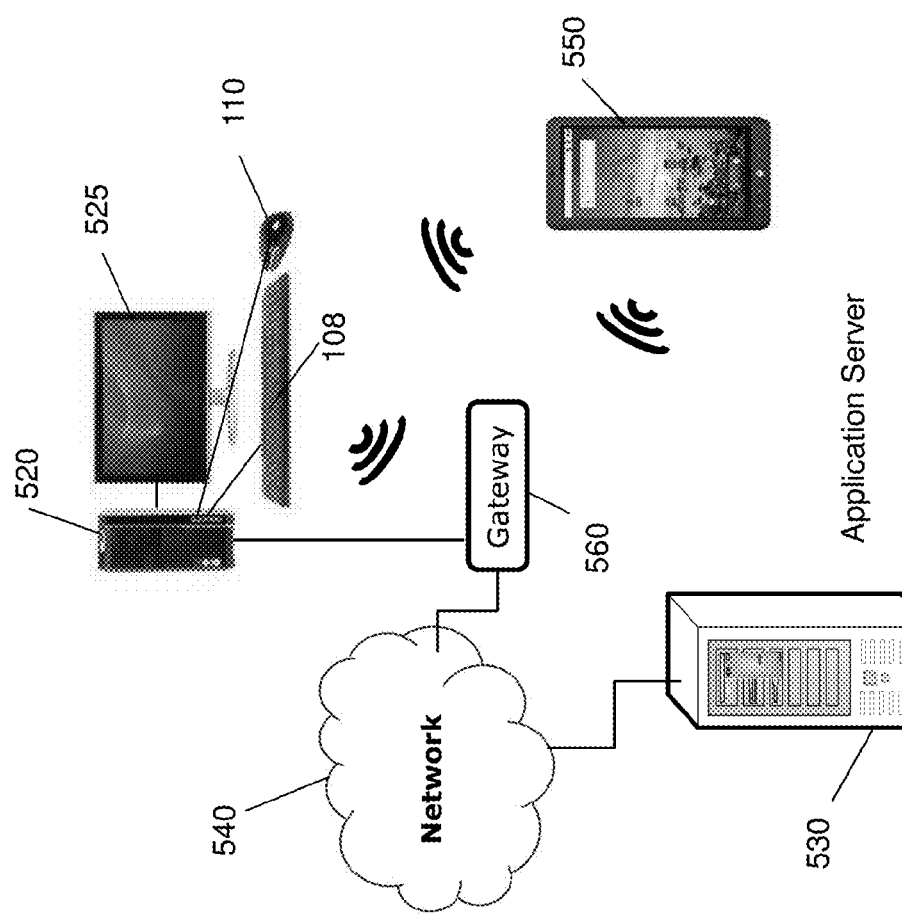
FIG. 5 depicts an illustrative embodiment of a computer environment for executing a software application that can be configured by way of the AMS application.

FIG. 5 depicts an illustrative embodiment of a computing system 500. The system 500 can include combinations of device components, such as a computer device 520, a gateway device 560, an application server 530, and/or a mobile computing device 550. In one embodiment, the computing system 500 provides computer resource capabilities for executing one or more software programs or applications using combinations of resources available at one or more of the devices in the computing system 500.

In one embodiment, a software application can be executing entirely at the computer device 520, in a stand-alone configuration, using processing, memory, and input/output resources directly available to the computer device 520 as controlled by an operating system resident at the computer device 520. For example, a user can interact with the software application using input devices, such as a keyboard 108 and/or a mouse 110, and a graphical display 525. In another example, the user can play a video game software application by utilizing only the computing resources available to the computer device 520, such as a computer processor and memory located within the computer device 520.

In one embodiment, the computing system 500 can execute a software application, in a networked or shared configuration, by accessing computing resources from the computing system 500 that are beyond those directly available at the computer device 520. For example, the computer device 520 can be configured to execute as software application that is resident at the application server 530. The application server 530 can perform all of, or a substantial portion of, the processing and memory functions necessary for executing the software application. The computer device 520 can, in turn, provide the input/output and graphical interface functionality necessary for the user to interact with the application. User inputs can be captured at the computer device 520 and transmitted to the application server 530 via a network connection provided by the gateway device 560 and the network 540, such as the Internet. The application server 530 can utilize the transmitted user inputs from the computer device 520 while processing and updating the state of the software application. In turn, the application server 530 can transmit graphical video and audio information back to the computer device 520 via the same network connection to provide graphical feedback to the user.

The computer device 530 can include hardware components, such as a computer processing unit (CPU), memory, and input/output interfaces, and software components, such as an operation system, software applications, and code for interpreting user interactions with the computer input/output interfaces. In one embodiment, the computer device 520 can be a desktop computer. In other embodiments, the computer device 520 can be a mobile computing device 550, such as a laptop computer, a smart pad device, a mobile smartphone, or another other computing device capable of executing software applications, interpreting and applying user inputs, and presenting data associated with the software applications to a user through a display 525.

In another embodiment, the computer device 520 can be coupled to one or more input/output devices, such as a keyboard device 108 or a mouse device 110. The computer device 520 can be coupled to other input devices, such as a headset 114, a gaming controller 115, or a joystick 116. The one or more input/output devices can be coupled to the computer device 520 by a wired connection or by a wireless connection. In one embodiment, the computer device 520 can receive stimulations or stimulation inputs from the input/output devices and can process these stimulations for use by a software application at the computer device 520.

In another embodiment, the computer device 520 can be coupled to a gateway device 560. The gateway device 560 can provide connectivity to the computer device 520 to allow the computer device 520 to communicate with other devices over a wide area network (WAN) 540 or a local area network (LAN). In one embodiment, the computer device 520 can communicate with devices over an internet protocol connection or, simply, and internet connection. For example, the computer device 520 can connect to a gaming server 530 over an internet or world-wide-web link. In one embodiment, the computer device 520 can execute a software application, such as a video game, using resources local to the computer device 520. For example, the computer device 520 can execute the video game via its operating system using local CPU and memory. In another embodiment, the computer device 520 can enable participation in a video game that is being executed at the gaming server 530. For example, the computer device 520 can receive and process user stimulations via input/output devices 108 and 110 and can transmit these stimulations to the gaming server 530 via a network 540. The gaming server 530 can provide the stimulation inputs to an operation system for use in executing the video game. The gaming server 530 can then provide gaming outputs, such as video graphics, to the computer device 520 using the network 540. The computer device 520 can then present the gaming output information at a local display 525.

In another embodiment, the computer device 520 can communicate with a mobile communication device 550, such as a laptop computer, a smart pad device, or a mobile smartphone. In one embodiment, the computer device 520 and the mobile communication device 550 can communicate through the gateway device 560. For example, the gateway device 560 can provide an Ethernet link or a wireless fidelity (WiFi) link to either or both of the computer device 520 and the mobile communication device 550. In one embodiment, the computer device 520, the mobile communication device 550, and the gateway device 560 are all part of a local area network (LAN). In another embodiment, this LAN is further capable of communicating to a wide-area link (WAN), such as the network 540, using the gateway device 560 as a single-point connection. In another embodiment, the computer device 520 and the mobile communication device 550 can communicate via a direct link, without the assistance of the gateway device. For example, the computer device 520 and the mobile communication device 550 can each support a short distance wireless communication protocol, such as Bluetooth or WiFi. Alternatively, the computer device 520 and the mobile communication device 550 can communicate using a long-distance protocol, such as cellular communication. In another embodiment, the computer device 520 and the mobile communication device 550 can communicate using a combination of linking technologies. For example, the mobile communication device 550 can communicate through a cellular communication link, not shown, that is coupled to the network 540. Communications can be further routed from the network 540, through the gateway device 560, and to the computer device 520. In one embodiment, the mobile communication device 550 can be used as an input/output device for the computer device 520. For example, user inputs can be captured at the mobile communication device 550 and transmitted to the computer device 520. In one example, the mobile communication device 550 can be used as a game controller to provide user navigation for a video game operating at the computer device 520. In another example, the computer device 520 can transmit graphical output information from an executing video game to the mobile communication device 550. The mobile communication device 550 can then present the graphical information at its integrated display.

In one embodiment, the computer device 520 can receive a request to configure a computing environment for executing a software application. For example, a request can be received over a communication link between the mobile communication device 550 and the computer device 520. In another example, a stimulation can be received from an input/output device 108 and 110, where the stimulation is pre-configured to serve as a request to configure the computing environment. In one embodiment, the computer device 520 can determine that a request to configure the computing environment has been received by considering the current context of operations at the computer device 520. For example, the computer device 520 can monitor for any stimulation or communication associated with an execution or requesting an execution of a software application. If the message is received from the mobile communication device 550, or if a stimulation is received from an input/output device 108, which indicates a request to execute a software application, then the computer device 520 can interpret the received communication or stimulation as a request to configure the computing environment. In another embodiment, the request can be received from a gaming server 530.

In one embodiment, the computing environment for the software application can simply include the computer device 520. For example, a software application, such as a video game, can be stored in memory at the computer device 520, executed by an operating system of the computer device 520, controlled by input/output device 108 and 110 in direct connection to the computer device 520, and graphically presented at a display 525 controlled by the computer device 520. This scenario would correspond to a "stand-alone" mode, where all of the required computing resources needed for execution of the video game are be available within or via the direct control of the computer device 520.

In another embodiment, the computer device 520 can use computing resources that are outside of the direct operational control of the device 520. For example, the computer device 520 can store and executed a video game via its local memory and CPU but require outside resources, such as access to a resource via an internet-connected network 540. In another example, the computer device 520 can require communications with a second device, such as the mobile communication device 550. These communications can require a secondary communication device, such as a gateway device 560 and can rely on computing resources at the secondary device that are not directly controllable by the computer device 520. In this scenario, the computer device 520 operates in a "cooperating" mode.

In another embodiment, the computer device 520 can receive user stimulations from input/output devices 108 and 110, transmit these stimulations to a gaming server 530, and receive video/audio graphics from gaming server 530 reflecting the execution of the game. The gaming server 530 executes the video game, while the computer device 520 performs the role of user interface. In this scenario, the computer device 520 operates in a "terminal" mode.

Each of the operating modes for the computer device 520 (stand-alone, cooperative, and terminal) can require a different combination of available resources at the computer device 520. In the stand-alone mode, the computer device 520 requires local resources for processing, memory, display, and input stimulation. However, resources for communications linking and/or internet access may not be required. In the terminal mode, the computer device 520 can require substantial network bandwidth for internet communications. However, the local processor requirements can be minimal. In a cooperative mode, the computer device 520 can require substantial communication resources but can perhaps limit resources needs in another area where a resource requirement is met by a secondary device. Regardless of the operating mode of the computer device 520, optimal operation and user acceptance of the performance of the software application can depend on the ability of the computer device 520 to access computing resources in the computing environment. For example, if a software application a mode of operation requires substantial memory capacity or processing capacity or internet bandwidth at the computer device 520, then a deficiency in one of these resources can make the software application function poorly or malfunction and can adversely impact the user.

In one embodiment, an Accessory Management Software (AMS) application can be resident at the computer device 520. In a further embodiment, the AMS application can process the request to configure the computer environment. In one embodiment, the AMS application can determine the availability of various computer resources in the computer environment. In one embodiment, the configuration request to determine which mode of operation is being requested. For example, the source of the request can be evaluated to determine if the request is for stand-alone, cooperative, or terminal mode. A request originating from a gaming server 530 can be interpreted as a request for operation of the computer device 520 in a terminal mode. In another example, the mode of operation can be included in the request. A request for configuration from a mobile communication device 550 can include information on the role of the mobile communication device 550 in the execution of the software application. In one embodiment, the computing environment for executing the software application is defined by the mode of operation (stand-alone, cooperative, or terminal).

In one embodiment, other factors can be used to define the computing environment. In one embodiment, configuration information can be associated with the software application, with the computer device 520, a secondary device 550, or a gaming server 530, or with a user of the computer device 520, a secondary device 550, or a gaming server 530. The configuration information can be in the form of a file or a message that is stored at, or received by, the computer device 520. In one embodiment, configuration information is associated with the software application. For example, a video game application can include a configuration file that is made available to the executing operating system when the video game is invoked. The configuration information can include a set of resource requirements for the video game. The configuration information can describe preferred resource requirements and/or minimum requirements. In another embodiment, the configuration information can include more than one set of resource requirements. Various sets of requirements can be directed to different operating modes, different types of computer device 520 and/or operating systems, different versions of the video game, different levels of user performance (e.g., beginner, intermediate, and advanced), and/or different input/output devices 108 and 110.

In another embodiment, a request for configuration can be associated with a source of the request for configuration. For example, if the request originates at a mobile communication device 550, or other secondary device, then the request can be accompanied by configuration information, in the form of a message or file that defines one or more sets of resource requirements for the computing environment. In another example, a request originating at a gaming server can include configuration information that defines the resource requirements that computer device 520 must provide for terminal mode operations.

In another embodiment, the configuration request can be associated with the device that will be executing the software. If the computer device 520 will be executing the software, then the computer device 520 can store configuration information that is specific to stand-alone or cooperative operations. In another embodiment, the configuration request can be associated with a user of the computer device 520 or of a mobile communication device 550 or of the gaming server 530. For example, the computer device 520 can store a set of configuration files that each correspond to a different user of the computer device 520. The computing environment for the computer device 520 can be customized according to which user is currently accessing the device 520. In another example, the gaming server 530 can have a large number of users. The gaming server 530 can store different computing environment configurations for each user. When the software program is initiated at the gaming server 530, the gaming server 530 determines the set of users associated with the software application at that time and transmits user-specific configuration information to the computer devices 520 that are being accessed by each user.

In one embodiment, the AMS application can determine the availability of one or more resources in the computing environment. For example, configuration information can include a list of resources that must be assessed for availability. For example, the configuration information associated with a video game can require that the AMS application determine the available capacity of the processor and/or the memory at the computer device 530. As another example, the status and/or capacity of a virus protection application can be determined. In another embodiment, the AMS application can determine which applications and/or processes are currently executing at the computer device and/or using computing resources associated with the computer environment. For example, the AMS application can access system information at the computer device 520 to determine the current usages and available capacities for one or more processors, various types of memory, communication services, and/or input/output services. For example, the AMS application can access a communication port and/or a gateway device to determine current usages and available capacities for wired and wireless communication ports and/or internet connections.

In one embodiment, the AMS application can compare the availability of computer resources in the computing environment to preferred or required resources as defined in the configuration information. For example, after determining a current available capacity of local random access memory (RAM) at the computer device 520, the AMS application can compare this available capacity to a preferred RAM capacity that is provided in the configuration information. Similarly, the current availability of each computer resource in the computing environment can be compared to the required and/or preferred availabilities of the configuration information. In one embodiment, the AMS application can identify resource deficiencies through the comparing of current availabilities to preferred/required availabilities.

In one embodiment, where the AMS application determines resource deficiencies, then the AMS application can adjust one or more operations in the computing environment to change the availability of computing resources. In one embodiment, the AMS application can terminate the execution of specific applications and/or processes executing in the computer environment to free up computing resources. In one embodiment, the configuration information can include a list of applications/processes that can be terminated and/or a list of applications/processes that must be available during subsequent execution of the application. In one embodiment, the AMS application can initiate one or more applications/processes if such are required/preferred for execution of the application in the computer environment. In one embodiment, the AMS application can adjust the availability of processing capacity and/or memory capacity.

In one embodiment, the AMS application can determine the operating status of anti-virus or other malware prevention software operating in the computer environment. In one embodiment, the configuration information can include settings for the anti-virus/malware prevention software that will provide preferred or required capabilities in the computer environment. For example, the AMS application can be directed by the configuration information to insure that the anti-virus/malware prevention software does not perform a scan or does not perform an update during execution of a video game.

In another embodiment, the AMS application can adjust operation of a gateway device 560 or another device that provides communication capability for the computing environment. For example, an available internet bandwidth through a gateway device 560 can be determined. If the available internet bandwidth is less than the preferred/required capability described in the configuration information, then AMS application can adjust the internet operations of the gateway device 560 to improve the availability. For example, the gateway device 560 can host communication sessions for other devices that are not related to the performance of a video game executing in the computing environment. One or more of these communication sessions can be terminated at the gateway device 560, under the direction of the AMS application, to reduce the bandwidth demands at the gateway device 560. In another embodiment, the AMS application can direct the gateway device 560 to limit internet access through the gateway device 560 to a specified maximum and/or to guarantee a specified bandwidth. The gateway device 560 can automatically limit access to devices unrelated to the video game in order to meet the directives.

In one embodiment, the AMS application can be configured to monitor the operation of the computing environment 500 to determine available resources and to adjust availability of resources as needed for operations of software in the system. New computing processes can be added to the computing environment to facilitate operation of the software. For example, the AMS application can monitor for availability of memory resources in the computing environment. If memory resources are inadequate at a computer device 520, but can be accessed remotely from a server 530 by means of execution of a memory sharing application, then the AMS application can start the memory sharing application upon the discovery of the resource deficiency. Similarly, the AMS application can terminate computing processes that interfere with the resource needs of the software application. For example, the AMS application can sense active operation of software or hardware in the computing system 500 that could divert processing, communication bandwidth, or memory resources from the software application. The AMS application can be configured to terminate or place these potentially interfering processes into standby mode.

In one embodiment, the AMS application monitors operation in the computing environment 500 continuously such that resource issues can be addressed before, during, and/or after execution of the software application. For example, the AMS application can alter the configuration of the computing environment prior to initiation of the software application. The configuration can cause processes to begin and/or to end. During execution of the software application, such as during execution of a computer game, processes can further be modified. For example, the AMS application could be configured to shut down, or place into standby mode, a WiFi communication process at a gateway 560 to prohibit internet traffic by computing devices, such as mobile communication device 550, during the playing of an internet-based game at a computer 520. However, during the game play, gaming application can require use of the WiFi link at the gateway 560 to, for example, add a mobile communication device 550 as a player or as an input/output device. The AMS application can sense the requested need for the WiFi channel at the gaming software and can further modify operation of the computer system 500 during the game play to accommodate the additional requirement. The AMS application can monitor resources while the game is being executed. If memory usage seems to be going up and might exceed current available memory, the AMS application can turn off other processes that may not be critical to add more memory capacity. In another example, during a gaming application, suppose a gamer can invokes a software application, such as team chat, the will require greater resources for network communications and/or WiFi capability. The AMS will review the environment and further optimize it so that the game is not affected by the addition of team chat.

In another embodiment, at the end of the execution of the software application, such as at the end of a game play session, the AMS application can return the computing system 500 to its pre-game state. For example, if the AMS application disabled a virus protection at the computer device 520, then the virus protection can be re-enabled.

In another embodiment, the AMS application can be configured to set up the computing environment to add alter the performance of processes and/or applications rather than turning these processes and/or applications ON or OFF. For example, the AMS application can be configured to automatically set a networked communication application to "Do Not Disturb" or to automatic forwarding to voicemail when a game begins. The AMS application can thereby prevent distractions to a human operator of the computing environment 500 during a software execution.

In another embodiment, the AMS application can be configured to take a "snapshot" of the computing environment before, during, or after an application is executed. A "before" snapshot can be used as a baseline for AMS to return the computing environment 500 to this state of operations, as much as possible, after the application completes. An "after" or a "during" snapshot can be used by AMS to save one or more configurations of the computing environment for use in future sessions.

Figure 6:
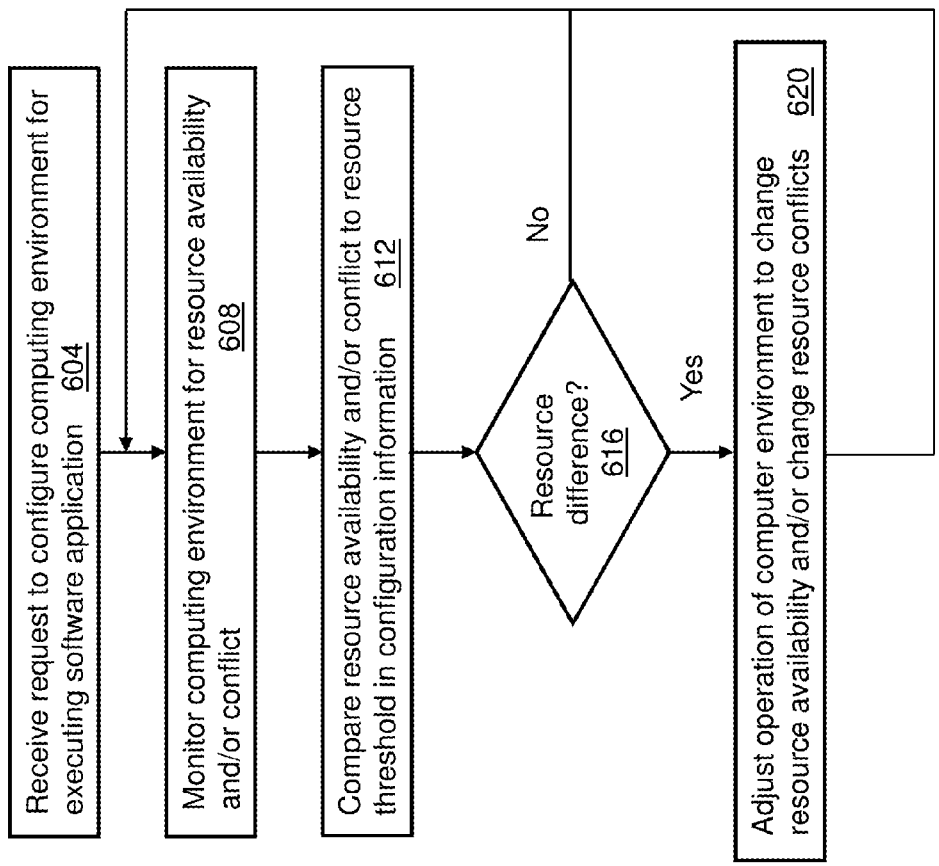
FIG. 6 depicts a method describing illustrative embodiments for configuring a computer environment by way of the AMS application.

FIG. 6 depicts illustrative embodiments for a method for configuring a computing environment for executing a gaming program in the AMS application. In one embodiment, in step 604, the AMS application can receive a request to configure a computing environment for executing a software application. The request can be in the form of a message or a stimulation, which is pre-defined as a request for configuration. The request can be deduced from the context of a received message or stimulation. The request can include configuration information that can be used for the configuration process. The request can come from an input/output device, a secondary device, a mobile communication device, and/or a gaming server.

In step 608, the AMS application can monitor the computing environment to for resource availability and/or conflicts and/or resource configurations. AMS can determine one or more availabilities of one or more resources of the computing environment. Configuration information can be associated with devices in the computing environment, with users of the computing environment, and/or with the software application. The configuration information can identify which resources are checked for availability. The availability determination can include determining the current capacity and the maximum possible capacity. Currently applications and processes can be determined.

In step 612, the AMS application can compare the actual availability of one or more resources with preferred/required availability as defined by the configuration information. Actual capacity can be compared to preferred capacity for processing, memory, and/or internet bandwidth. The capacities of resources of more than one device in the computing environment can be assessed and compared. AMS can detect the presence of processes and/or hardware that could cause disruptions during the execution of the software application. AMS can detect the absence of processes and/or hardware that could enhance the performance, efficiency, or human interaction with the application. AMS can detect if processes and/or hardware are configured for best performance. Any of these comparisons can reveal a difference between an ideal or hoped for configuration and/or performance of the computing environment and the actual configuration and/or performance. In step 616, the AMS application can determine if there is a difference between a preferred configuration and an actual configuration. If a difference is detected in step 616, then the AMS application can adjust one or more operations of the computer environment to change the availability of resources and/or to change resource conflicts. Software applications/processes can be initiated or terminated as described by the configuration information. Internet connections can be initiated or terminated as directed by the AMS application to insure proper bandwidth. The operation of anti-virus or malware applications can be altered to eliminate interference with a requested application. AMS can continuously monitor the computing environment for performance before, during, and after execution of the software application.

FIG. 7 depicts an exemplary diagrammatic representation of configuring a computing environment 700 by optimizing resources using the AMS application. When a request is received for configuration of the computing environment 700, the AMS application can survey the computer environment to determine initial resource availability and active processes. For example, a computer device 520 can receive a request from a mobile communication device 550 to configure the environment for execution of a video game. The AMS application can respond by surveying the system resources at the computer device 520 and/or at other devices in the computer environment, such as a gateway device 560. The initial resource availability can include capacities for processing, memory, anti-virus operation, and internet bandwidth. For example, the initial processing and memory available capacities can be 20% and 30%, respectively, the anti-virus software can be enabled for scanning, and the internet can have 25% available bandwidth. In another embodiment, the AMS application can determine the processes or applications that are currently executing in the computing environment.

In one embodiment, the AMS application can compare the initial resource availability to a set of preferred/required resource capacities as defined in the configuration information. If the AMS application finds one or more deficiencies, then it can adjust the performance of the computing environment to eliminate or minimize these deficiencies. In the example, the configuration information can list preferred/required resources that include processing and memory available capacities of 35% and 50%, respectively, disabling the scanning of the anti-virus software during execution of the video game, and an available internet bandwidth of 40%. The AMS application can determine that each of these resource requirements is not sufficiently met in the current configuration of the computing environment. The AMS application can adjust the performance of the computing environment by directing actions to reduce the number of application/processes that are executing. For example, Applications B and C can be terminated. In addition, the AMS application can direct the anti-virus software to disable scanning. The AMS application can also direct the gateway device to end communication sessions and thereby free up additional internet bandwidth.

Figure 8:
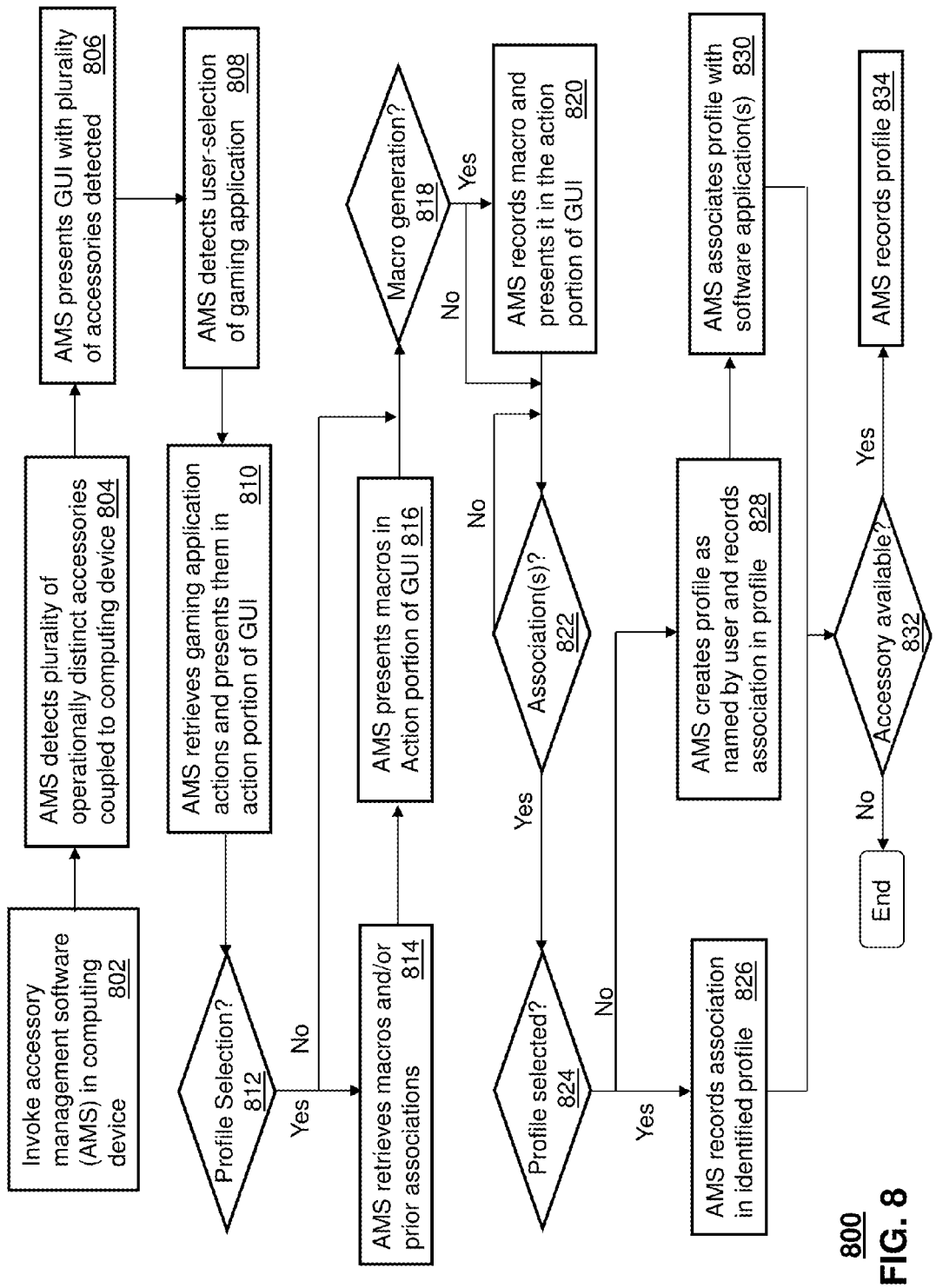
FIGS. 8-10 depict methods describing illustrative embodiments of the AMS application.
Figure 9:
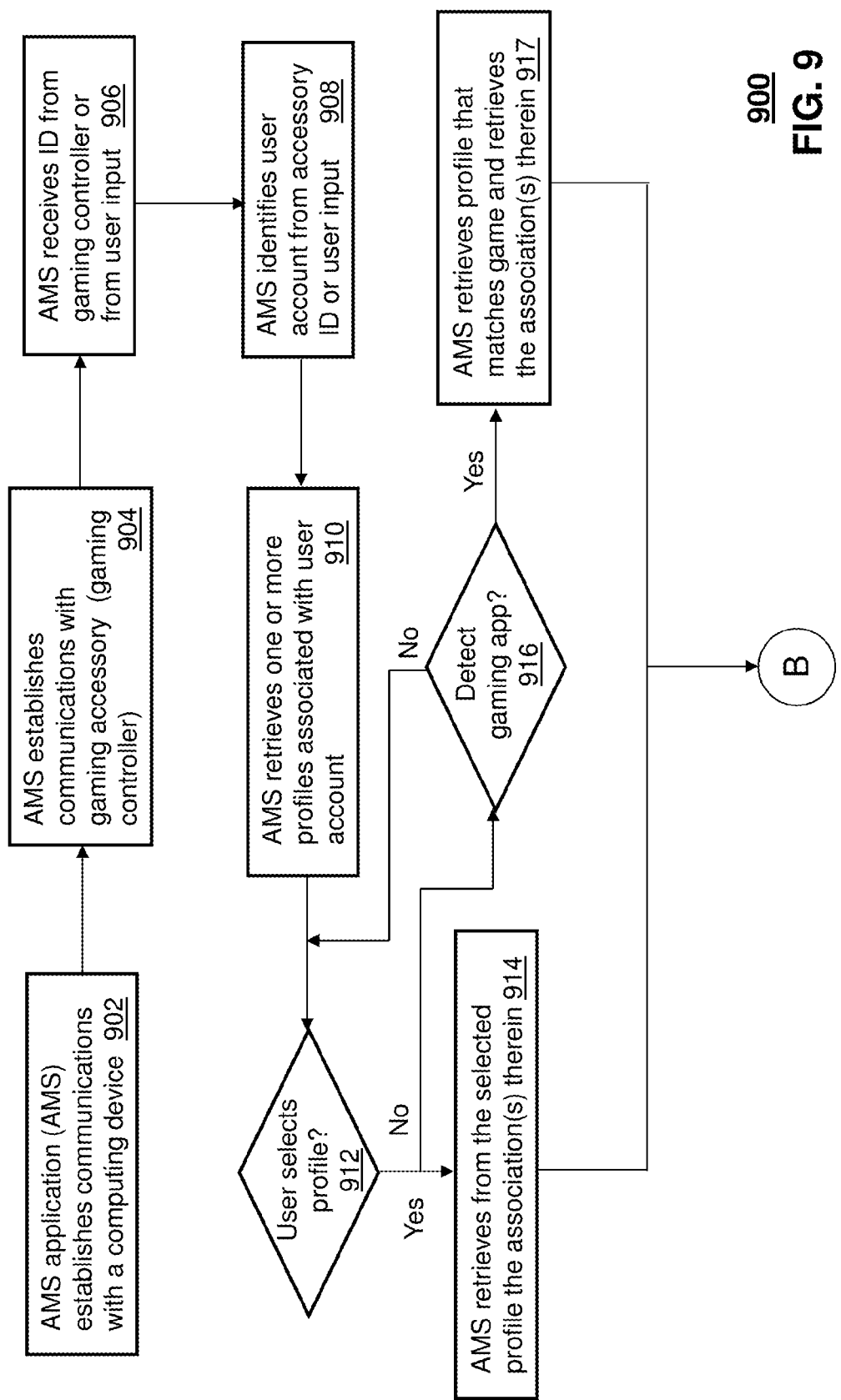

FIGS. 8-9 depict methods 800-700 describing illustrative embodiments of the AMS application. Method 800 can begin with step 802 in which the AMS application is invoked in a computing device. The computing device can be a remote server (not shown), the gaming console 206 of FIGS. 2-3, or any other computing device with suitable computing resources. The invocation step can result from a user selection of the AMS application from a menu or iconic symbol presented on a desktop of the computing device by an operating system (OS) managing operations thereof. In step 804, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a gaming controller, a mouse, a joystick, a microphone, or a headset with a microphone—just to mention a few.

In step 806, the AMS application presents a GUI 101 such as depicted in FIG. 1 with operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 808, the AMS application can be programmed to detect a user-selection of a particular software application such as a game. This step can be the result of the user entering in a Quick Search field 160 the name of a gaming application (e.g., World of Warcraft™ or WoW). Upon identifying a gaming application, the AMS application can retrieve in step 810 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the key board 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the Melee Action can be associated with a combination of key button presses (e.g., simultaneous depression of the left and right buttons 119, 121, or a sequence of button depressions: two rapid left button depressions followed by a right button depression).

In yet another embodiment, the Melee Action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can associate standard stimuli generated by manipulating a gaming accessory with substitute stimuli that control gaming actions of a video game. The AMS application can be adapted to perform these associations based on a gaming venue state such as the ones described above. Accordingly, the associations made between stimuli supplied by an accessory such as the gaming controller 115 can be venue state dependent. The gaming venue state can be a description of a gaming state (e.g., entering a tank which requires the use of gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

At step 812 the AMS application can also respond to a user selection of a profile. A profile can be a device profile or master profile invoked by selecting GUI button 156 or 158, each of which can identify the association of gaming actions with input functions of one or more accessories. If a profile selection is detected in step 812, the AMS application can retrieve in step 814 macro(s) and/or prior associations defined by the profile. The actions and/or macros defined in the profile can also be presented in step 816 by the AMS application in the actions column 130 of the GUI 101 to modify existing profile associations or create new associations.

In step 818, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by an operating system (OS), or any other recordable stimulus to initiate, control or manipulate software applications. For instance, a macro can represent a user entering the identity of a software application (e.g., instant messaging tool) to be initiated by an OS upon the AMS application detecting through speech recognition a speech command.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 820. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 822, the AMS application can respond to drag and drop associations of actions and input functions of the keyboard 108 or the gaming controller 115. Associations can also be made based on the two or three dimensional movements of the gaming controller 115. If user input indicates that a user is performing an association, the AMS application can proceed to step 824 where it can determine if a profile has been identified in step 812 to record the association(s) detected. If a profile has been identified, the associations are recorded and/or stored in the profile in step 826. If a profile has not been identified in step 812, the AMS application can create a profile in step 828 for recording the detected associations. In the same step, the user can name the newly created profile as desired. The newly created profile can also be associated with one or more gaming software applications in step 830 for future reference. The AMS application can also record in a profile in step 826 associations based on gaming venue states. In this embodiment the same stimuli generated by the gaming controller 115 can result in different substitutions based on the gaming venue state detected by the AMS application.

The AMS application can be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and substitute stimuli according to the detected gaming venue state.

Referring back to step 826, once the associations have been recorded in a profile, the AMS application can determine in step 832 which of the accessories shown illustratively in FIGS. 1-3 are programmable and available for programming. If the AMS application detects that the accessories (e.g., keyboard 108, gaming controller 115) are communicatively coupled to a computing device from which the AMS application is operating (e.g., gaming console 306) and programmable, the AMS application can proceed to step 834 of FIG. 8 where it submits the profile and its contents for storage in one of the accessories (e.g., the gaming controller 115 in FIGS. 2-3) or the dongle 203. Once the gaming controller 115, dongle 303, or combinations thereof are programmed with the profile, such devices can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can provide options for layout of the accessory selected (button 122), how the keyboard is illuminated when associations between input functions and actions are made (button 134), and configuration options for the accessory (button 126).

The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application. Selecting button 106 can also cause the AMS application to adapt the GUI 101 to present promotional offers and software updates.

The steps of method 800 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 800 or variants thereof. These undisclosed approaches are contemplated by the present disclosure.

FIG. 9 depicts a method 900 for illustrating the operations of the AMS application for either of the configurations shown in FIGS. 2-3. In the configurations of FIGS. 2-3, the AMS application can be operating in whole or in part from the gaming controller 115, the dongle 203, the gaming console 206, a remote server (not shown), or a computing device such as a desktop computer (also not shown). For illustration purposes, it is assumed the AMS application operates from the gaming console 206. Method 900 can begin with the AMS application establishing communications in steps 902 and 904 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 906, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 908 a user account associated with the gaming controller 115 and/or headset 114. In step 910, the AMS application can retrieve one or more profiles associated with the user account.

In step 912, the user can be presented by way of a display coupled to the gaming console 206 profiles available to the user to choose from. If the user makes a selection, the AMS application proceeds to step 914 where it retrieves from the selected profiles the association(s) stored therein. If a selection is not made, the AMS application can proceed to step 916 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 917 where it retrieves a profile that matches the gaming application detected and the association(s) contained in the profile. As noted earlier, association(s) can represent accessory stimulations, navigation, and speech, invocation of other software applications, macros or other forms of suitable associations that result in substitute stimulations. The accessory stimulations can be stimulations that are generated by the gaming controller 115, as well as stimulations from other accessories (e.g., headset 114), or combinations thereof.

Figure 10:
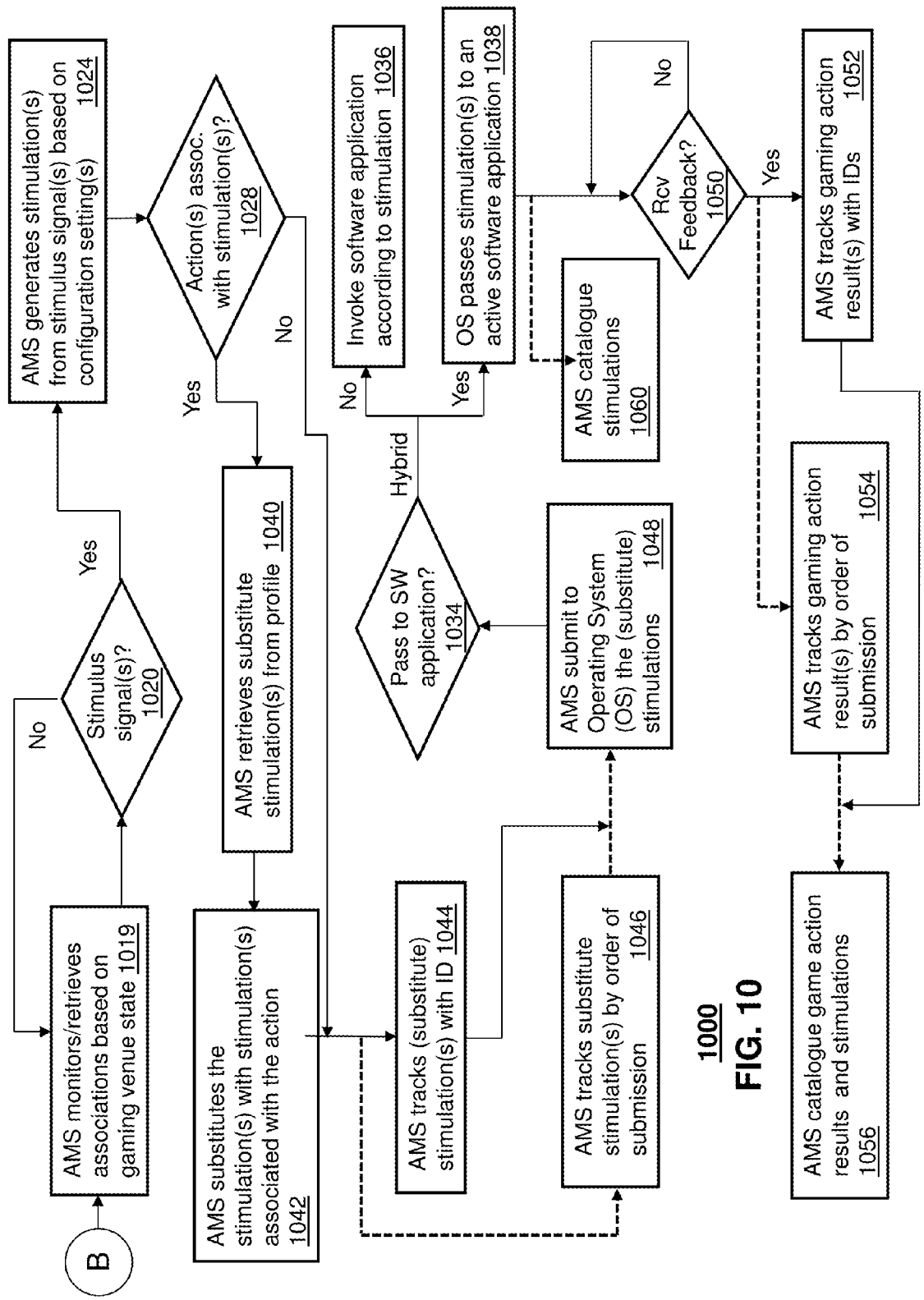

Once a profile and its contents have been retrieved in either of steps 914 or step 917, the AMS application can proceed to step 1019 of FIG. 10 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 1019 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 1019 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 1019, the AMS application retrieves the associations related to the venue state, and can perform substitutions of stimuli generated by the gaming controller 115, and/or speech commands received by microphone of the headset 114.

The AMS application can monitor in step 1020 stimulus signals generated by the accessories coupled to the gaming console 206. The stimulus signals can be generated by the gamer by manipulating the gaming controller 115, and/or by generating speech commands detected by the headset 114.

If a stimulus signals are detected at step 1020, then the AMS application can generate stimulations from the stimulus signals based upon configuration settings in step 1024. In one embodiment, the configuration settings can establish a digital responsiveness of the AMS application to changes in a stimulus signal of an accessory device. For example, a configuration setting can determine a speed of response to a movement of a mouse device. When a mouse device is moved in space, digital data is generated indicating a direction and distance of movement relative to a former position. A polling algorithm in the AMS application can read the output data of the mouse device at periodic intervals to determine if the mouse position has changed and, if so, the direction and magnitude of this change. In several embodiments, one or more configuration settings can be assigned and stored in the AMS application to control digital responsiveness, resolution, speed, feedback, and/or sensitivity of one or more accessory devices. For example, one or more configuration settings can be defined for counts per inch (CPI) for movement of an input device, frames per second (FPS) and/or dots per inch (DPI) for a display device, inches per second (IPS) for speed and acceleration of an input device, lift distance for a three-dimensional input device, polling rate, feedback intensity, scrolling and/or double-click speed, direction sensitivity and/or window pointer speed for an input device.

The configuration settings can affect playing performance when using the accessory device. For example, the counts per inch setting for a mouse device can directly affect how a mouse movement is translated into an input action at an application such as a computer game. If the CPI is set at a low resolution, movements of the input device will appear grainy or imprecise. This can be a useful setting if the game requires rapid but imprecise moves and/or is programmed to snap movements to a fixed grid pattern. However, if the game play requires precise movements, then a low CPI resolution can make it difficult or impossible to succeed at the game. For example, a game that requires precise aiming of a weapon may also require at least a minimum CPI for successful game play. As another example, a CPI that set too high can create an input with too much resolution. For example, a mouse with too much resolution for the application can be seem to be too "busy" in its movements, where even the slightest movement of twitch from the user generates a movement output. If the gaming application updates the graphical interface upon every movement of the input device, then this additional resolution can create a busy display or twitchy aiming or can even slow down game execution.

In one embodiment, the AMS application uses configuration settings to optimally convert stimulation signals from an accessory device into stimulations than can be further processed by the AMS application or sent directly to an executing game. The configuration settings can allow the player to configure the accessory device performance to fit their playing style and preferences and can be maintained in a player profile. In another embodiment, the configuration settings can be maintained in a game profile so that a player can establish and reuse configuration settings that are tailored to a particular gaming venue. In one embodiment, the configuration settings can have a default configuration that is established by the AMS application and/or by add-in applications and/or set-up data associated with each accessory device. For example, the AMS application can have default configuration settings for a mouse device. In one embodiment, the default configuration settings can be reviewed and updated using the AMS graphical user interface. In another embodiment, the default configuration settings can be overwritten by importing settings for a new or existing device. For example, a new device can include configuration setting information that can be downloaded into the AMS application.

In one embodiment, the AMS application converts each stimulus signal from each communicating accessory device into a digital stimulation signal based on the current configuration settings. For example, the AMS can have configuration settings for a mouse device that include a setting for dots per inch of 1200, and a polling rate of 500 Hertz. A stimulation signal from a communicating mouse device would be processed by the AMS application using these settings to generate a simulation signal associated with the mouse device.

In step 1028, the AMS application can determine whether to forward the stimulations to an Operating System (OS) of the gaming console 206 as stimulations without substitutions. This determination can be made by comparing the stimulations to an association in the profile. If the stimulations match the associations, then the AMS application proceeds to step 1040 where it retrieves substitute stimulations in the profile. In step 1042, the AMS application can substitute the stimulations with the substitute stimulations in the profile. In one embodiment, the AMS application can track in step 1044 the substitute stimulations by updating these stimulations with a unique identifier such as a globally unique identifier (GUID). In this embodiment, the AMS application can also add a time stamp to each substituted stimulation to track when the substitution was performed.

In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Once the stimulations received in step 1020 have been substituted with other stimulations in step 1042, and the AMS application has chosen a proper tracking methodology for correlating gaming action results with stimulations, the AMS application can proceed to step 1048 and submit the substitute stimulations to the OS of the gaming console 206. If in step 1022 the detected stimulation(s) do not match an association in the profile, then the AMS application proceeds to one of steps 1044 or 1046 in order to track the stimulations of the accessory. Once the AMS application has performed the necessary steps to track the stimulation as originally generated by the accessory, the AMS application proceeds to step 1048 where it submits stimulations (with or without substitutions) to the OS of the gaming console 206 with or without tracking information as previously described.

In step 1034, the OS determines whether to invoke in step 1036 a software application identified in the stimulation(s) (e.g., gamer says "turn on team chat", which invokes a chat application), whether to forward the received stimulations to the gaming software application in step 1038, or combinations thereof. Contemporaneous to the embodiments described above, the AMS application can monitor in step 1050 for game action results supplied by the gaming application via a defined API. The game action results can be messages sent by the gaming application by way of the API of the gaming application to inform the AMS application what has happened as a result of the stimulations sent in step 1038. For instance, suppose the stimulation sent to the gaming application in step 1038 is a command to shoot a pistol. The gaming application can determine that the shot fired resulted in a miss of a target. The gaming application can respond with a message which is submitted by way of the API to the AMS application that indicates the shot fired resulted in a miss. If IDs such as GUIDs were sent with each stimulation, then the gaming application can submit game action results with their corresponding GUID to enable the AMS application to correlate the gaming action results with stimulations having the same GUID.

For example, if the command to shoot included the ID "1234", then the game action result indicating a miss will include the ID "1234", which the AMS application can use in step 1052 to identify the stimulation having the same ID. If on other hand, the order of game action results can be maintained consistent with the order of the stimulations, then the AMS application can correlate in step 1054 stimulations with game action results by the order in which stimulation were submitted and the order in which game action results were received. In step 1056, the AMS application can catalogue stimulations and game action results. In another embodiment, the AMS application can be adapted to catalogue the stimulations in step 1060. In this embodiment, step 1060 can be performed as an alternative to steps 1050 through 1056. In another embodiment, step 1060 can be performed in combination with steps 1050 through 1056 in order to generate a catalogue of stimulations, and a catalogue for gaming action results correlated to the stimulations.

Figure 11:
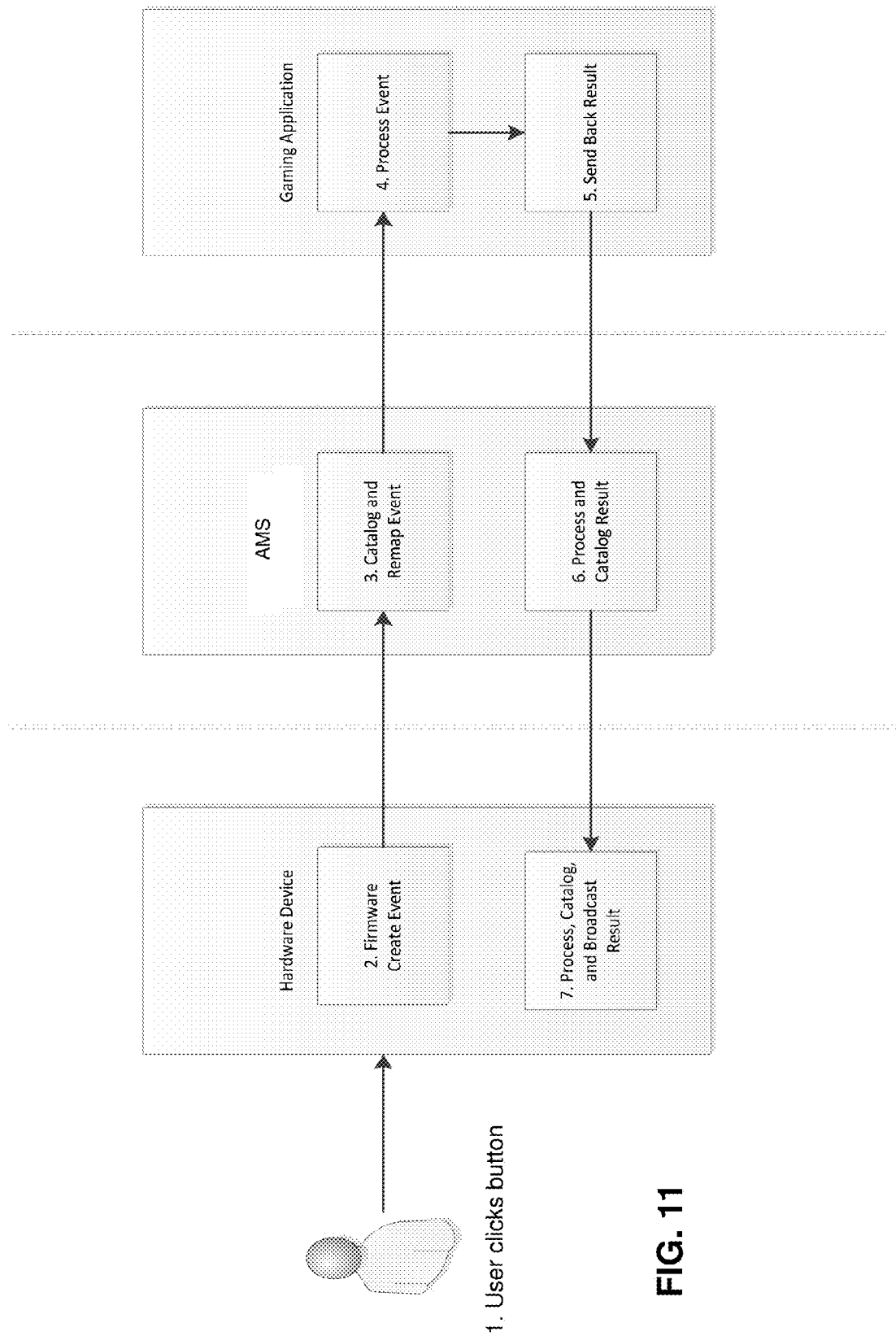
FIGS. 11-12 depicts illustrative embodiments of communication flow diagrams utilized by the AMS application.
Figure 12:
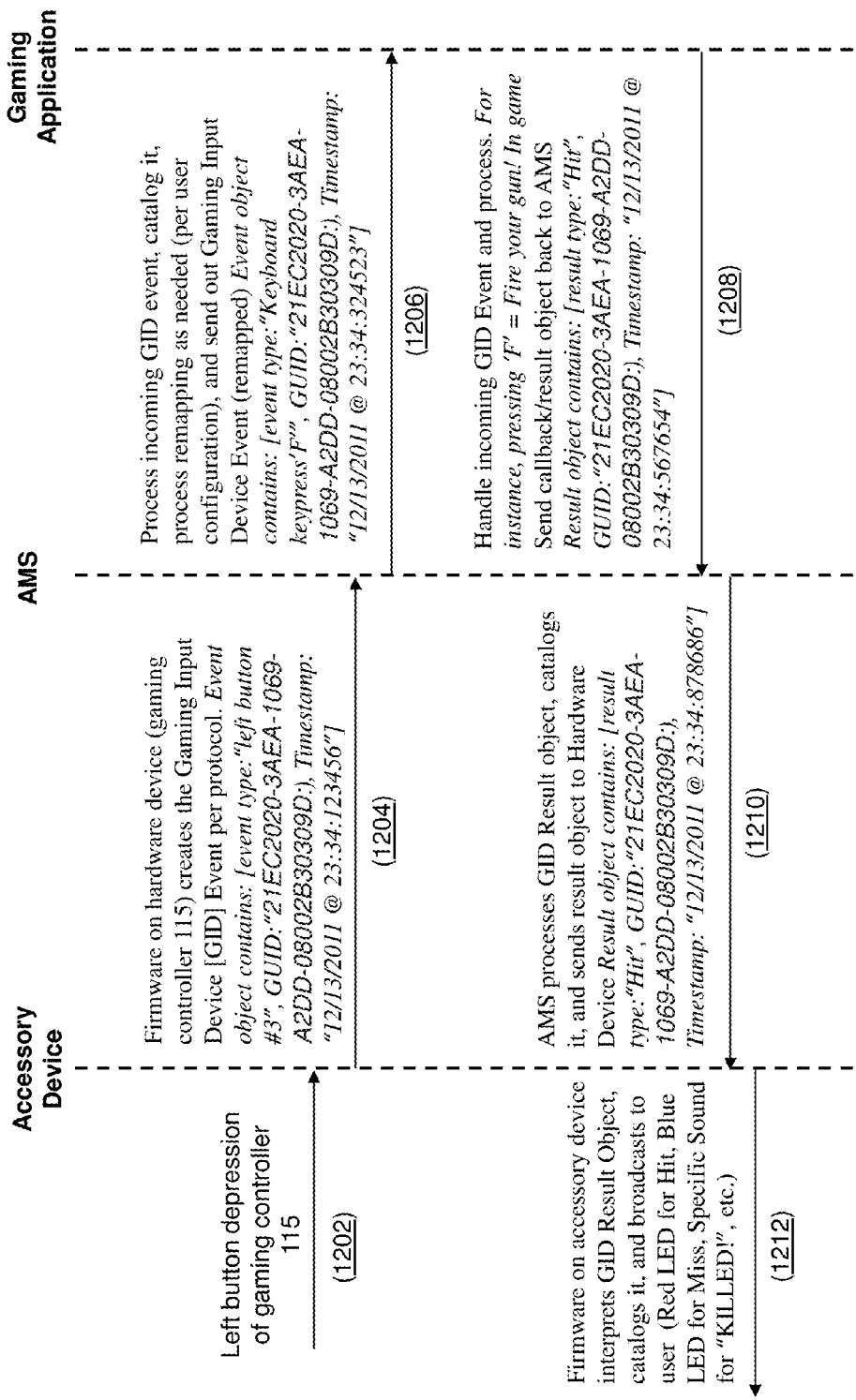

FIGS. 11-12 illustrate embodiments of a system with a corresponding communication flow diagram for correlating stimulations and gaming action results. In this illustration a user clicks a left button of a gaming controller 115. The gaming controller 115 can include firmware (or circuitry), which creates an event as depicted by event 2 in FIG. 11. The button depression and the event creation are depicted in FIG. 12 as steps 1202 and 1204. In step 1204, the firmware of the gaming controller 115 can, for example, generate an event type "left button #3", and a unique GUID with a time stamp which is submitted to the AMS application. Referring back to FIG. 8, the AMS application can catalogue event 3, and, if a substitute stimulation has been predefined, can remap the event according to the substitution. The remapped event is then transmitted to the gaming application at event 4. Event 3 of FIG. 8 is depicted as step 1206 in FIG. 12. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 1208 in FIG. 12. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 1210, the AMS application correlates the stimulation "left button #3 (and/or the substitute stimulation keyboard "F") to the game result "Hit" and catalogues them in memory. The AMS application then submits to the accessory (e.g., gaming controller 115) in step 1210 the game action results "Hit" with the same GUID, and a new time stamp indicating when the result was received. Upon receiving the message from the AMS application, the accessory in step 1212 can process the "Hit" by asserting a red LED on the accessory (e.g., left button illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

In an embodiment where the AMS application receives gaming results from a gaming application via an API as described above, the communication flow diagram shown in FIG. 12 can be modified with a more comprehensive protocol that includes a weapon type being monitored, misses, non-kill hits (i.e., a hit that does not result in a kill), kill hits, and loss of life rate.

The AMS application can present performance factors of each gamer, and the type of weapons being tracked (e.g., sniper rifle, machine gun, hand gun) as shown in FIGS. 13-14. To identify which weapon is being used at any point in time during a gaming session, the AMS application can highlight the weapon in a distinguishable color such as blue while keeping all other weapon rows in gray. The AMS application can calculate an average hit rate from the misses, non-kill hits, and kill hits. The AMS application can compare gaming action results between the gamers to identifying leading performance factors as shown in the "Comp Rating" column of each player. In a tournament setting, the performance factors shown in FIGS. 13 and 14 can be shown in side-by-side monitors, or together in a JumboTron™ display such as those used in sporting events or the like.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115. To further enhance the experience for the audience, the gamer's image can be shown as a video clip during the competition. The AMS application can also be adapted to present a portion of the video game associated with each gamer as shown in FIGS. 12-14.

The methods of FIGS. 5 and 7-9 can be adapted to operate in whole or in part in a gaming accessory, in an operating system of a computer, in a gaming console, in a gaming application that generates the video game, in a dongle, or any other suitable software application and/or device. The method of FIGS. 5 and 7-9 can be adapted to ignore or filter game action results, which may not be relevant to the gamer or analysts. For instance, the AMS application can be adapted to ignore (or filter) game action results relating to navigation of the avatar (e.g., turn around, jump, etc.). The AMS application can also be adapted to ignore (or filter) game action results relating to preparatory actions such as reloading a gun, switching between weapons, and so on. In another embodiment, the AMS application can be adapted to selectively monitor only particular game result actions such as misses, non-kill hits, kills, and life of the avatar. The AMS application can also be adapted to monitor gaming action results with or without temporal data associated with the stimuli and game action results.

In one embodiment, the AMS application can be adapted to track stimuli (or substitutions thereof) by submission order, and order of gaming action results supplied by the gaming application, and perform cataloguing thereof by the respective order of stimuli and gaming action results. The items can be catalogued by the AMS application with or without temporal data.

In one embodiment, the AMS application can be adapted to collect gaming action results for "all" or a substantial portion of stimuli (or substitutions thereof) transmitted to the gaming application. In this embodiment, the AMS application can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In one embodiment, the AMS application can be implemented as a distributed system (e.g., one or more servers executing one or more virtual machines) enabling multiples users to control aspects of the AMS application. For example, in a tournament setting, gaming analysts having access to the AMS application can request a replay of portions of the game to demonstrate exceptional plays versus missed plays at a JumboTron™ display. The gamers can access the AMS application to establish new substitute stimuli, perform calibrations on macros, or invoke or create additional gaming profiles. Portions of the AMS application can also be implemented by equipment of unaffiliated parties or service providers of gaming services.

In one embodiment, the AMS application can be adapted to substitute an accessory stimulus (or stimuli) with a macro comprising a combination of substitute stimuli, and to track the macro when gaming action results are received from the gaming application—rather than tracking each individual substitute stimulus of the macro. The AMS application can be adapted to monitor macros by tracking an order of stimuli (or substitutes) associated with the macro that are transmitted to the gaming application and by tracking an order of gaming action results received from the gaming application, which are associated with the macro. Alternatively, or in combination the AMS application can add a unique identifier to the substitute stimuli to identify the stimuli as being associated with the macro.

The AMS application can be adapted to catalogue the gaming action results associated with the macro in a manner that allows the gamer to identify a group of gaming action results as being associated with the macro. The AMS application can be adapted to collect sufficient data to assess each individual gaming action result of the macro (e.g., temporal data, hits, misses, etc.). The presentation of catalogued macro data can be hierarchical. For example, the AMS application can present a particular macro by way of a high level GUI that indicates the macro caused a kill. The AMS application can be adapted to enable the gamer to select a different GUI that enables the user to visualize a gaming action result for each stimulus of the macro to determine how effective the macro was in performing the kill, and whether further adjustments of the macro might improve the gamer's performance.

In one embodiment, the AMS application can be adapted to present more or less competitive information than is shown in FIGS. 13-14. In one embodiment, for example, the AMS application can be adapted to present competitive information without the virtual peripherals. In one example, the AMS application can be adapted to present scrollable pages of competitive information with or without the virtual peripherals. In another illustration, the AMS application can be adapted to present competitive information without a viewing of the game or the gamer. Other variants of presenting competitive information or other data shown in FIGS. 13-14 are contemplated by the present disclosure.

The foregoing embodiments are a subset of possible embodiments contemplated by the present disclosure. Other suitable modifications can be applied to the present disclosure.

Figure 15:
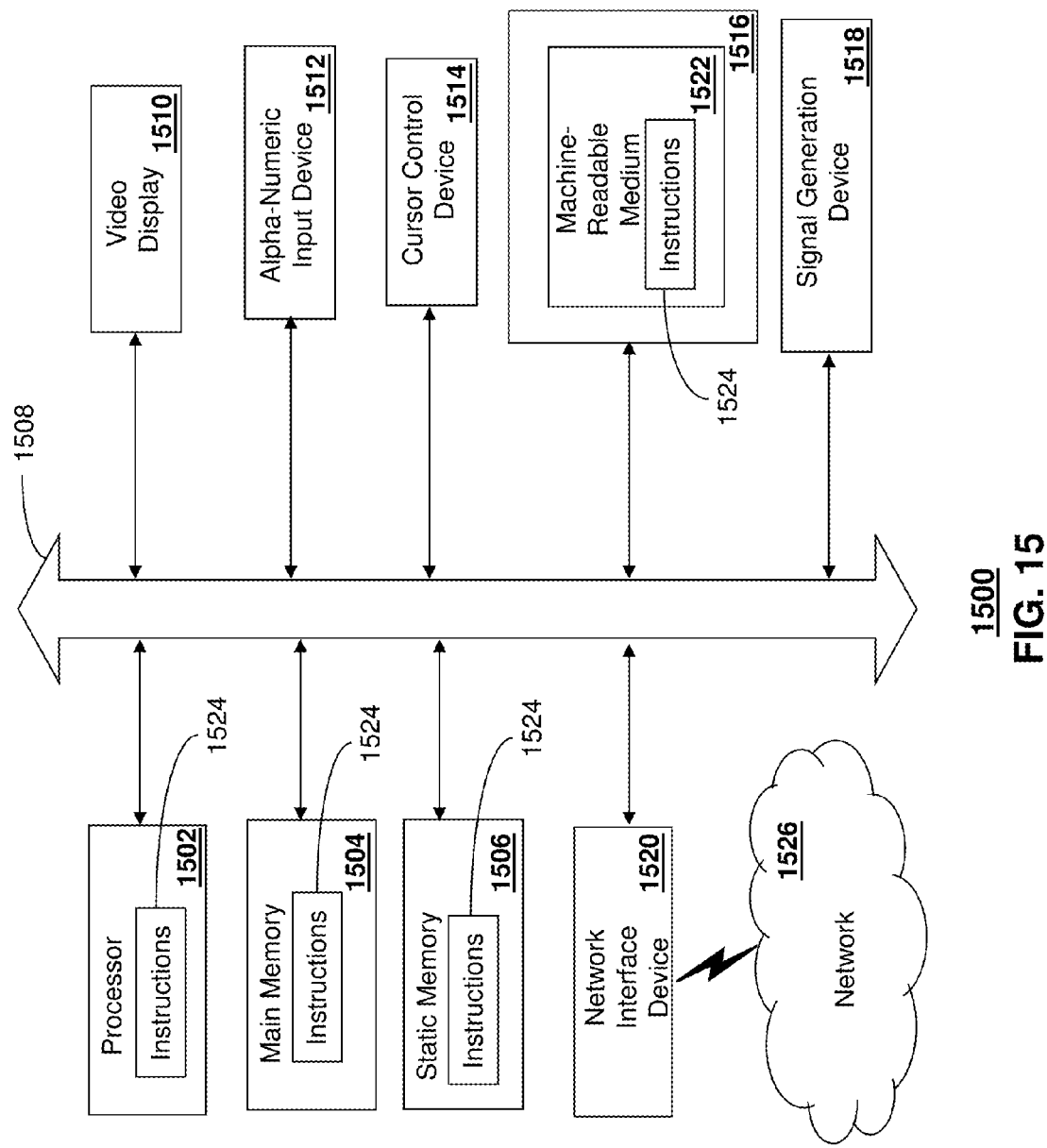
FIG. 15 depicts an illustrative diagrammatic representation of a machine in the form of a computer system within which a set of instructions, when executed, may cause the machine to perform any one or more of the methodologies disclosed herein.

FIG. 15 depicts an exemplary diagrammatic representation of a machine in the form of a computer system 1500 within which a set of instructions, when executed, may cause the machine to perform any one or more of the methods discussed above. One or more instances of the machine can operate as any of devices depicted in FIGS. 1-3, and FIG. 15. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, or a solid state display. The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a memory that stores executable instructions; and
a processor communicatively coupled to the memory, wherein the processor, responsive to executing the executable instructions, performs operations comprising:
monitoring an availability of a resource of a computing environment that is executing a software application;
comparing the availability of the resource to a preferred availability of configuration information to identify a resource deficiency; and
adjusting an operation of the computing environment to change the availability of the resource responsive to identifying the resource deficiency, wherein the adjusting of the operation of computing environment comprises limiting internet traffic at the computing environment.

2. The device of claim 1, wherein the adjusting of the operation of computing environment further comprises moving the executing of the software application from a first computer device to a second computer device.

3. The device of claim 1, wherein the adjusting of the operation of computing environment further comprises limiting access to a memory resource of the computing environment.

4. The device of claim 1, wherein the operations further comprise receiving from a mobile communication device a request to configure the computing environment.

5. The device of claim 1, wherein the resource comprises a capacity of the processor.

6. The device of claim 1, wherein the resource comprises a capacity of a memory.

7. The device of claim 1, wherein the resource comprises a bandwidth of an internet connection.

8. The device of claim 1, wherein the resource comprises a capacity of anti-virus program.

9. The device of claim 1, wherein the adjusting of the operation of the computing environment further comprises restricting access to an internet connection.

10. The device of claim 9, wherein the restricting of the access to the internet connection comprises controlling performance of a gateway device.

11. The device of claim 1, wherein the operations further comprise retrieving configuration information of the software application.

12. The device of claim 11, wherein the configuration information identifies a plurality of resource levels associated with a plurality of resources.

13. The device of claim 11, wherein the configuration information is associated with a user of the computing environment.

14. A non-transitory machine-readable storage medium, comprising executable instructions that, when executed by a processor, facilitate performance of operations, comprising:
   receiving a request from a wireless communication device to configure a computing environment for executing a software application;
   identifying a difference between a configuration of a plurality of available resources and a preferred configuration of the plurality of available resources in the computing environment responsive to the request; and
   adjusting an operation of the computing environment to modify operations of the computing environment for the executing of the software application responsive to identifying the difference, wherein the adjusting of the operation of the computing environment comprises limiting access to a memory resource at the computing environment.

15. The non-transitory machine-readable storage medium of claim 14, wherein the adjusting of the operation of the computer environment further comprises stopping execution of a second software application of the computing environment, and wherein the wireless communication device is a mobile communication device.

16. The non-transitory machine-readable storage medium of claim 14, wherein the adjusting of the operation of the computing environment further comprises limiting internet traffic at the computing environment.

17. A method, comprising:
   monitoring, by a device including a processor, an availability of a resource of a computing environment that is executing a software application;
   comparing, by the device, the availability of the resource to a preferred availability of configuration information to identify a resource deficiency; and
   adjusting, by the device, an operation of the computing environment to change the availability of the resource responsive to identifying the resource deficiency, wherein the adjusting of the operation of computing environment comprises limiting internet traffic at the computing environment.

18. The method of claim 17, wherein the resource comprises a resource capacity of the processor or of a memory.

* * * * *